(12) United States Patent
Moon et al.

(10) Patent No.: US 12,682,153 B2
(45) Date of Patent: Jul. 14, 2026

(54) SYSTEMS AND METHODS FOR GENERATING CONTEXTUAL TABLE EMBEDDINGS FOR TABULAR DATA

(71) Applicant: JPMORGAN CHASE BANK, N.A., New York, NY (US)

(72) Inventors: Sae Young Moon, Edmonton (CA); Lili Tao, Bristol (GB); Sean Moran, London (GB); Kostis Gourgoulias, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 177 days.

(21) Appl. No.: 18/179,767

(22) Filed: Mar. 7, 2023

(65) Prior Publication Data

US 2024/0242024 A1 Jul. 18, 2024

(30) Foreign Application Priority Data

Jan. 13, 2023 (GR) ............................... 20230100024

(51) Int. Cl.
*G06F 40/18* (2020.01)
*G06F 16/22* (2019.01)
*G06F 40/126* (2020.01)
*G06F 40/183* (2020.01)

(52) U.S. Cl.
CPC .......... *G06F 40/18* (2020.01); *G06F 16/2237* (2019.01); *G06F 40/126* (2020.01); *G06F 40/183* (2020.01)

(58) Field of Classification Search
CPC ...... G06F 40/18; G06F 40/183; G06F 40/126; G06F 16/2237; G06F 40/177; G06F 40/30
See application file for complete search history.

(56) References Cited

U.S. PATENT DOCUMENTS

| | | | | |
|---|---|---|---|---|
| 11,823,477 | B1 * | 11/2023 | Ramezani | ............... G06F 40/30 |
| 12,271,698 | B1 * | 4/2025 | Wang | ............... G06F 16/24522 |
| 2005/0015716 | A1 * | 1/2005 | Lavoie | .................. G06Q 40/02 |
| | | | | 715/255 |

(Continued)

OTHER PUBLICATIONS

Tong et al., "CFCT: The cell function classification method for complex tables", IEEE, pp. 8 (Year: 2022).*

*Primary Examiner* — Chau T Nguyen
(74) *Attorney, Agent, or Firm* — GREENBERG TRAURIG LLP

(57) ABSTRACT

Systems and methods for generating contextual table embeddings for tabular data are disclosed. In one embodiment, a method may include: receiving, by a table embedding computer program, an input table comprising a plurality of cells; separating, by the table embedding computer program, the cells in the input table by data type, wherein the data type comprises a text data type or a numeric data type; embedding, by the table embedding computer program, the data type in each cell of the input table; enhancing, by the table embedding computer program, the cells of the input table based on a position and/or the data type; generating, by the table embedding computer program, contextual embeddings for the input table using an encoder of a table transformer; and generating, by the table embedding computer program, a table summary for the contextual embeddings using a decoder for the table transformer.

15 Claims, 3 Drawing Sheets

(56) References Cited

U.S. PATENT DOCUMENTS

| | | | | |
|---|---|---|---|---|
| 2008/0168036 A1* | 7/2008 | Young | .................. | G06F 16/2465 707/E17.037 |
| 2020/0012657 A1* | 1/2020 | Walters | ............... | G06F 21/6254 |
| 2021/0357443 A1* | 11/2021 | Rawat | ..................... | G06N 20/00 |
| 2021/0374338 A1* | 12/2021 | Shrivastava | ............ | G06F 40/30 |
| 2021/0383105 A1* | 12/2021 | Han | ........................ | G06V 20/62 |
| 2022/0067272 A1* | 3/2022 | Ripa | ........................ | G06F 40/18 |
| 2023/0206670 A1* | 6/2023 | Cui | ........................ | G06V 10/82 382/156 |
| 2023/0343414 A1* | 10/2023 | Vessere | .................. | G16B 30/00 |

* cited by examiner

SYSTEMS AND METHODS FOR GENERATING CONTEXTUAL TABLE EMBEDDINGS FOR TABULAR DATA

RELATED APPLICATIONS

This application claims the benefit of Greek Patent Application No. 20230100024, filed Jan. 13, 2023. The disclosure of this application is hereby incorporated, by reference, in its entirety.

BACKGROUND OF THE INVENTION

1. Field of the Invention

Embodiments generally relate to systems and methods for generating contextual table embeddings for tabular data.

2. Description of the Related Art

Large organizations often hold a large amount of tabular data. Due to the sheer volume, it is difficult to know what the data represents or how to best use the data.

SUMMARY OF THE INVENTION

Systems and methods for generating contextual table embeddings for tabular data are disclosed. In one embodiment, a method for generating contextual embeddings for tabular data may include: (1) receiving, by a table embedding computer program, an input table comprising a plurality of cells; (2) separating, by the table embedding computer program, the cells in the input table by data type, wherein the data type comprises a text data type or a numeric data type; (3) embedding, by the table embedding computer program, the data type in each cell of the input table; (4) enhancing, by the table embedding computer program, the cells of the input table based on a position and/or the data type; (5) generating, by the table embedding computer program, contextual embeddings for the input table using an encoder of a table transformer; and (6) generating, by the table embedding computer program, a table summary for the contextual embeddings using a decoder for the table transformer.

In one embodiment, semantic representations of text present in the cells of the text data type may be embedded in the cells.

In one embodiment, embedding may be embedded into the cells using linear projection.

In one embodiment, the computer program may enhance each of the cells with a Fourier encoding of its position in the input table.

In one embodiment, the encoder of the table transformer may be trained to generate the contextual embeddings using an attention mechanism.

In one embodiment, the table summary may include a sequence of text, and the decoder is trained to generate the sequence of text.

According to another embodiment, a system may include a data repository comprising a plurality of tables each comprising a plurality of cells; an electronic device executing a table embedding computer program that receives an input table out of the plurality of tables from the data repository, separates the cells in the input table by data type, wherein the data type comprises a text data type or a numeric data type, embeds the data type in each cell of the input table, enhances the cells of the input table based on a position and/or the data type, generates contextual embeddings for the input table using an encoder of a table transformer, and generates a table summary for the contextual embeddings using a decoder for the table transformer; and a downstream system that receives the contextual embeddings from the table embedding computer program.

In one embodiment, semantic representations of text present in the cells of the text data type may be embedded in the cells.

In one embodiment, embedding may be embedded into the cells using linear projection.

In one embodiment, the computer program may enhance each of the cells with a Fourier encoding of its position in the input table.

In one embodiment, the encoder of the table transformer may be trained to generate the contextual embeddings using an attention mechanism.

In one embodiment, the table summary may include a sequence of text, and the decoder is trained to generate the sequence of text.

According to another embodiment, a non-transitory computer readable storage medium, may include instructions stored thereon, which when read and executed by one or more computer processors, cause the one or more computer processors to perform steps comprising: receiving an input table comprising a plurality of cells; separating the cells in the input table by data type, wherein the data type comprises a text data type or a numeric data type; embedding the data type in each cell of the input table; enhancing the cells of the input table based on a position and/or the data type; generating contextual embeddings for the input table using an encoder of a table transformer; and generating a table summary for the contextual embeddings using a decoder for the table transformer.

In one embodiment, semantic representations of text present in the cells of the text data type may be embedded in the cells.

In one embodiment, embedding may be embedded into the cells using linear projection.

In one embodiment, the computer program may enhance each of the cells with a Fourier encoding of its position in the input table.

In one embodiment, the encoder of the table transformer may be trained to generate the contextual embeddings using an attention mechanism.

In one embodiment, the table summary may include a sequence of text, and the decoder is trained to generate the sequence of text.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Figure 1:
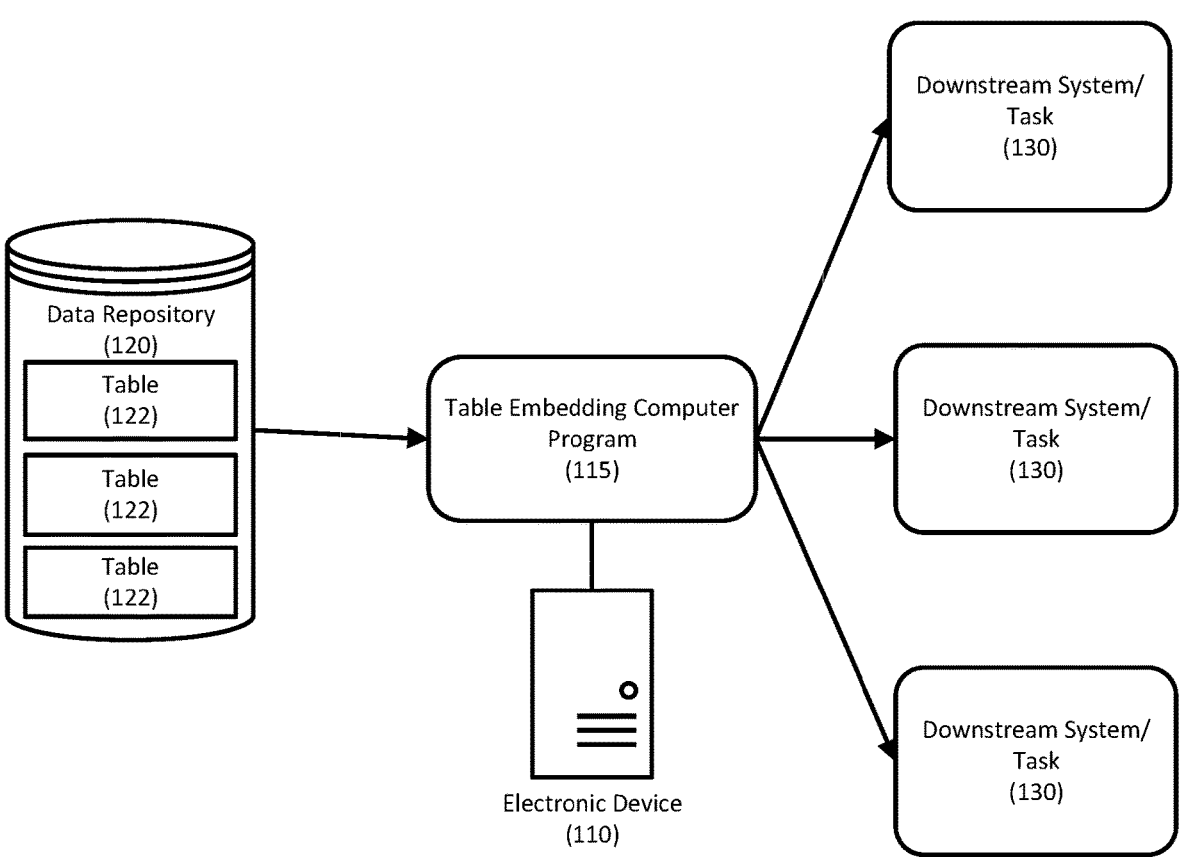
FIG. 1 depicts a system for generating contextual embeddings for tabular data according to an embodiment.

Embodiments are directed to systems and methods for generating contextual embeddings for tabular data.

Embodiments are directed to a transformer-based model that may generate contextual embeddings for any given tabular data. Embodiments may encode table content in its original data type (e.g., text, numeric, etc.) and may account for the structural representation of tables. This results in a meaningful feature representation of tabular data that may be used with downstream tasks.

In embodiments, table embeddings may be used to solve table-to-text tasks such as table summarization, table question-and-answering, and table topic classification. Table embeddings may also be used to understand similarity relationships among a collection of tables, so that tasks, such as table clustering and domain-specific dataset generation may be performed. Table embeddings may also be used to generate numerical insights, such as detecting trends in data, generating graphs, etc. Table embeddings may also be used to generate stylized and/or domain-specific textual reports.

For example, embodiments may generate summaries and/or quick insights for complex tabular data, which makes it easier for users to digest complex information in a short amount of time.

Embodiments may generate stylized reports using, for example, few-shot learning. An example of using large language models to generate text from tabular data using a few-shot learning matter is provided in Gong et al, "TableGPT: Few-shot Table-to-Text Generation with Table Structure Reconstruction and Content Matching," Proceedings of the 28th International Conference on Computational Linguistics, December 2020 (available at /aclanthology.org/2020.coling-main.179), the disclosure of which is hereby incorporated, by reference, in its entirety. For example, embodiments may generate domain-specific written reports given tabular data (e.g., a financial report, an academic report, etc.).

Embodiments may be used to optimize search engines. For example, tabular embeddings may be used to represent tabular information that may be present in internal websites. This may facilitate the retrieval of more relevant pages given user query.

Embodiments may facilitate data searching within tables. For example, relevant components of the table may be highlighted in response to a natural language query using grounding techniques. Grounding is a technique that is commonly used in the field of image recognition that aims to locate the most relevant region in an image based on a textual query. An example of grounding is disclosed in C. Deng et al. "Visual Grounding via Accumulated Attention," 2018 IEEE/CVF Conference on Computer Vision and Pattern Recognition, 2018, pp. 7746-7755" doi: 10.1109/CVPR.2018.00808, the disclosure of which is hereby incorporated, by reference, in its entirety. The principles of visual grounding in the tabular domain may be used to train the model to locate specific cells in the table that is relevant to natural language query. This will allow users to submit queries in order to identify key components of the table that they are interested in learning about.

In embodiments, similar tables with similar contents should have similar table embeddings. Thus, datasets of similar tables may be gathered for further data analysis. For example, embodiments may cluster table embeddings to get tabular dataset that relate to the same domain, etc. This may facilitate the generation of domain/task specific datasets for data analysts/scientists.

Contextual table embeddings may be generated for any tabular data, and are not limited to a specific dimension of the table or structural format of the table (e.g., column headers, merged cells, etc.). Thus, embodiments may use a single model to generate features for any type of tabular data.

Understanding the content in its original data format is critical for certain downstream tasks, such as numerical analysis, textual summarization, etc. Thus, in embodiments, a unique representation of the table contents based on their original data type format may be encoded. This preserves important information from the table. Cells containing textual data may be encoded with semantic embeddings obtained from large language models to obtain a semantic representation. Cells containing numeric data may be encoded to obtain a numeric representation.

In embodiments, the structure of the tabular data, such as the position of a cell in the table, may also be accounted for. For example, the row position of the cell may be accounted for using Fourier encoding of the row position.

As another example, each cell may be encoded with the column token. Thus, if a column heading is "date," each cell in that column may be embedded with a semantic embedding for "date."

In one embodiment, each cell may be encoded with the type of data in the cell, such as string, date time, numeric data, etc.

Referring to FIG. 1, a system for generating contextual embeddings for tabular data is disclosed according to embodiments. System 100 may include electronic device 110, such as servers (e.g., physical and/or cloud based), computers (e.g., workstations, desktops, notebooks, laptops, tablets, etc.), smart devices, Internet of Things (IoT) appliances, etc. Electronic device 110 may execute table embedding computer program 115, which may retrieve one or more table 122 from data repository 120 and may embed the table with certain information that may be used by one or more downstream systems or tasks 130.

Table 122 may be any suitable table, including, for example, finance tables, health tables, etc.

Downstream tasks 130 may include, for example, table classification, report generation, etc.

In one embodiment, execute table embedding computer program 115 may be deployed as a plugin to a spreadsheet program, a web browser plugin, a separate application, a distributed application, etc.

Figure 2:
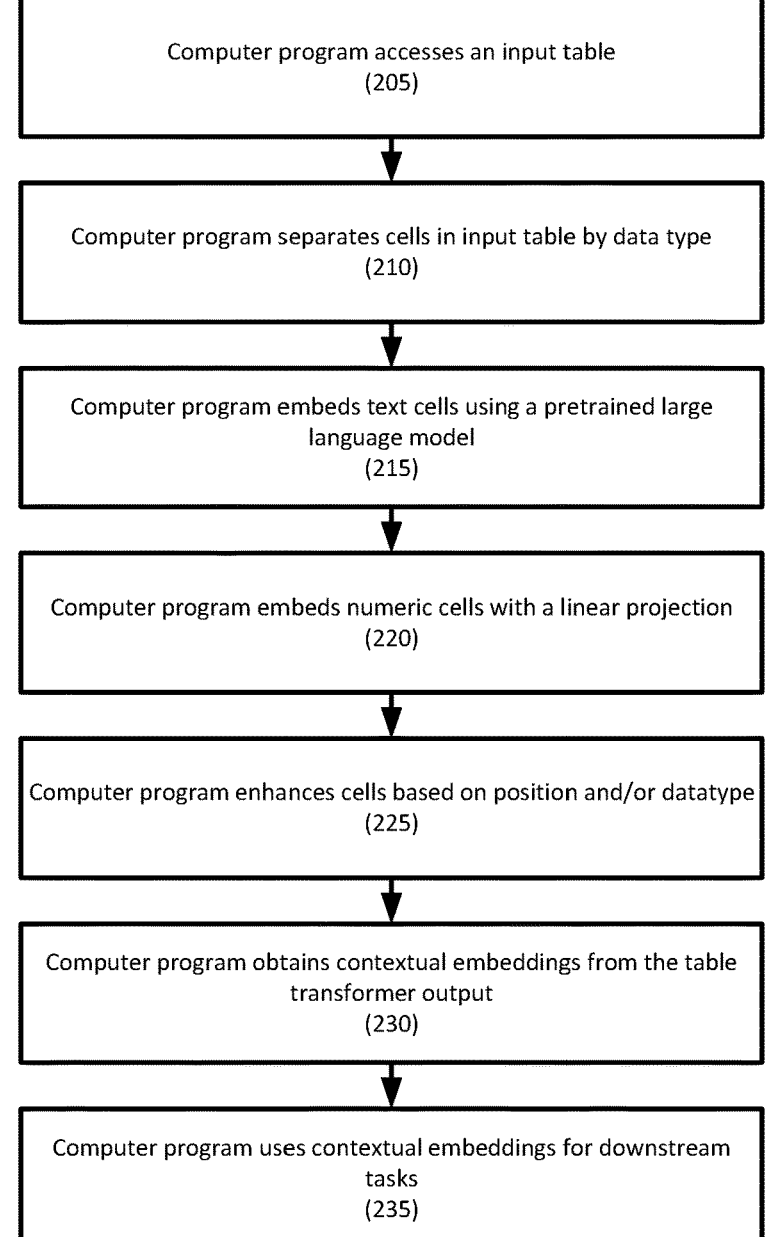
FIG. 2 depicts a method for generating contextual embeddings for tabular data according to an embodiment.

Referring to FIG. 2, a method for generating contextual embeddings for tabular data according to an embodiment.

In step 205, a computer program may access an input table. In one embodiment, the computer program may be a stand-alone computer program, or it may be deployed as a plugin to a spreadsheet computer program, a web browser plugin, etc. In one embodiment, the input table may be provided to the computer program, or the computer program may access the input table from the program on which it is being executed.

In step 210, the computer program may separate the cells in input table by data type. For example, the computer program may identify the data type in each cell (e.g., text or numeric).

In step 215, the computer program may embed text cells using a pretrained large language model. In one embodiment, the encoder of the large language model may generate semantic representations of text present in the text cells.

In step 220, the computer program may embed numeric cells using a linear projection. Linear projection involves mathematically transforming a feature vector from one dimension to another. For example, a one-dimensional feature vector containing numeric values from the table may be linearly projected to a two-dimensional feature vector containing float numeric values. In other words, a single numeric value is represented as a vector of numeric values in another dimensional space.

In step 225, the computer program may enhance the cells based on position and/or datatype using, for example, position/datatype aware table embedding. For example, the computer program may enhance cells based on their table embedding, the position of the cell in the table, the position of the cell in the column, and/or the data type of the cell.

In one embodiment, the computer program may embed a vector in the cell that represents the position of the cell in the table (e.g., a cell in column 3, row 71 may be encoded with 0003, 0071), a position of the cell in the column (e.g., 0071, a Fourier encoding of the row position)), and/or the data type of the cell (e.g., "txt" or "num"), etc. Note that these embeddings are exemplary only; other ways of embedding any of this information may be used as is necessary and/or desired.

The data contained in the cells of the table may be embedded by the computer program. Specifically, the computer program may be trained to represent data in each cell as a vector representation using neural network layers and pre-trained large language models.

In step 230, the computer program may obtain contextual embeddings using a table transformer. In one embodiment, the table transformer may include an encoder that learns to generate a contextual representation of sequential input (e.g., sequence of cells in a table) and a decoder that can interpret the encoded input to generate another meaningful sequence (e.g., a sequence of words describing the table). The table transformer may employ an attention mechanism that learns to pay attention to the elements in a sequence, thereby better representing each element. The table transformer encoder includes neural network layers (e.g., Wq, Wk, Wv) that learn to transform the sequential input into three vector representations: (1) query, (2) key, (3) value. These representations may be used to obtain the contextual representation of the sequential input using the attention formula outlined in the diagram.

In addition, the table transformer may have multiple "heads" or layers of attention, which allow it to learn multiple ways of transforming the sequential input to a contextual representation. In one embodiment, the table transformer may include the encoder component of the table transformer. The table transformer may obtain contextual representation of each cell in a table. An example of an architecture of the table transformer is disclosed in Vaswan et al., "Attention Is All You Need" (available at arXiv: 1706.03762), the disclosure of which is hereby incorporated, by reference, in its entirety.

The output of the table transformer may be a contextual embedding of the table that is contextual because the attention mechanism of the transformer encoder learned to pay attention to other cells in a sequence of cells (i.e., the input table) to obtain a more meaningful, contextual representation of every cell in the input table.

In step 235, the computer program may be used for various downstream tasks. In one embodiment, the contextual table embeddings may be used to generate stylized textual reports using, for example, few shot learning. For example, a sequence-to-sequence model may be trained on a few examples of specific types of reports (e.g., financial reports, project progress reports, etc.) to generate stylized reports. This sequence-to-sequence model architecture may take the contextual representations obtained from the computer program and generate a sequence of words (i.e., summary) using a decoder. This decoder may be a transformer-based decoder layer (e.g., GPT, T5, etc.) that has been trained to generate a sequence of text given features. GPT and T5 are models that have been developed for natural language tasks, whose architecture is based on the transformer model disclosed in Vaswan et al., "Attention Is All You Need" (available at arXiv:1706.03762).

As another example, the contextual table embeddings may be used to optimize search engines. For example, a machine learning model may be trained to map the similarity between text and the contextual tabular embeddings. As another example, machine learning models may be trained to highlight relevant components of a large table given natural language query using grounding techniques. This allows users to quickly pick out relevant information from potentially large and complex tables. In still another embodiment, the contextual tabular embeddings may use unsupervised clustering algorithms and may identify similar groups of tables. These clusters may contain tables from similar domains (e.g., financial, healthcare, etc.), which may be used to label and organize the vast amount of tabular data available. The tabular embeddings may also be used to retrieve tables that are similar to a reference table for further data analysis.

Examples of suitable transformer-based decoder layers are disclosed in Brown et al., "Language Models are Few-Shot Learners," Advances in Neural Information Processing Systems, vol. 33 1877-1901 (2020) (available at proceedings.neurips.cc/paper/2020/file/ 1457c0d6bfcb4967418bfb8ac142f64a-Paper.pdf) and in Raffel et al., "Exploring the Limits of Transfer Learning with a Unified Text-to-Text Transformer" (available at arXiv: 1910.10683), the disclosures of which are hereby incorporated, by reference, in their entireties.

Additional model architecture components may be needed (e.g., neural network layers) for this sequence-to-sequence model to learn how to interpret the information contained in the contextual representation of the table to generate a text summary.

In one embodiment, the computer program may be trained to obtain contextual embeddings of the table by solving a masked-cell prediction task during the pre-training step. In doing so, the computer program (e.g., the neural network layers) may learn to embed a table with masked cells. This embedding may then be used to reconstruct the table, and the computer program may evaluate how well the masked cells are reconstructed. By learning to accurately reconstruct the masked cells, the computer program learns to generate meaningful contextual tabular embeddings. This pre-training task may be based on common practices employed by other transformer-based language models such as BERT, disclosed in Devlin et al., "BERT: Pre-training of Deep Bidirectional Transformers for Language Understanding" (available at arxiv.org/abs/1810.04805, the disclosure of which is hereby incorporated, by reference, in its entirety), which may pre-train the model to reconstruct masked tokens in text.

For example, the neural network layers of the computer program may be trained to generate contextual representation of the table, and using that contextual representation, to try to reconstruct the cells in their original format (e.g., text and numeric values). A loss value (e.g., how well the original data contained in the cells was reconstructed) may be backpropagated through the neural network layers through gradient descent.

Figure 3:
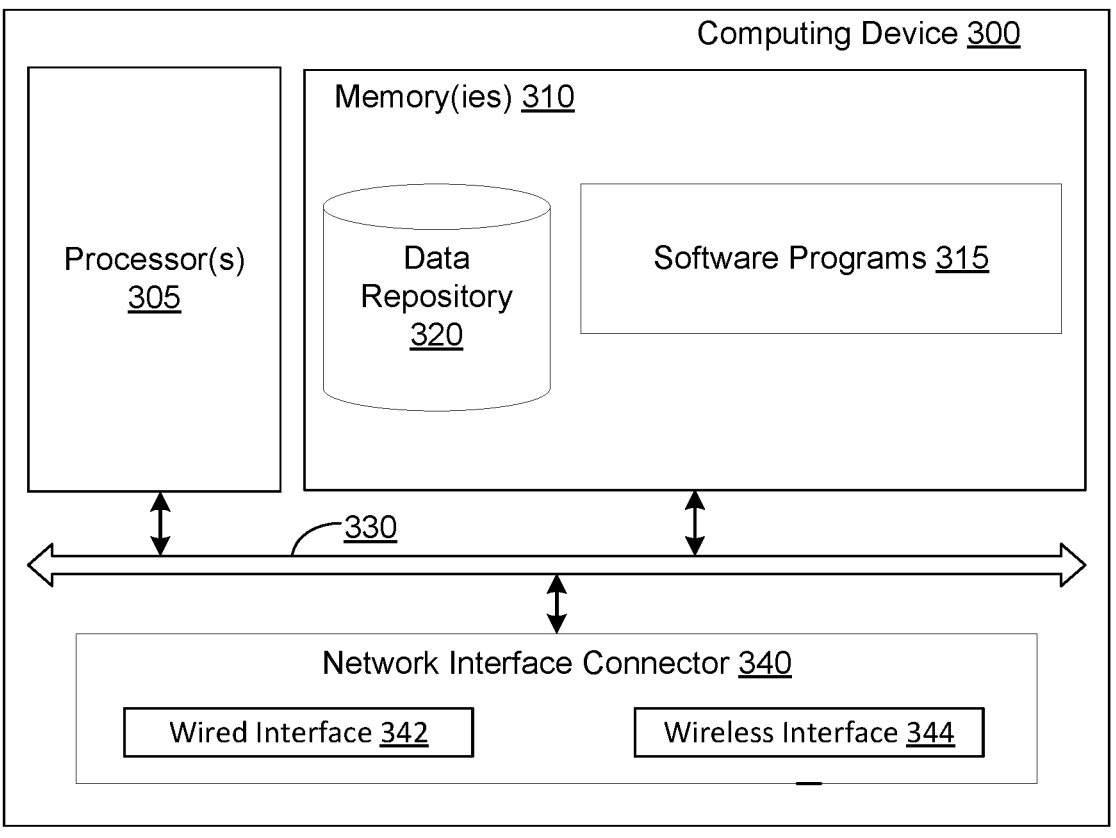
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for generating contextual embeddings for tabular data, comprising:

receiving, by a table embedding computer program, an input table comprising a plurality of cells;

separating, by the table embedding computer program, the plurality of cells in the input table by data type of each cell, wherein the plurality of cells are separated into cells of a text data type and cells of a numeric data type;

embedding, by the table embedding computer program and for each cell of the input table, the data type for the cell;

embedding, by the table embedding computer program and for each cell having the numeric data type, an embedding vector for a numeric value in the cell using linear projection;

enhancing, by the table embedding computer program, the cells of the input table based on a position by embedding a vector representing the position of each cell in the input table;

generating, by the table embedding computer program, contextual embeddings for the input table using an encoder of a table transformer; and generating, by the table embedding computer program, a table summary for the contextual embeddings using a decoder for the table transformer.

2. The method of claim 1, further comprising:

embedding, by the table embedding computer program and for each cell having the text data type, a semantic representation of text present in the cell.

3. The method of claim 1, wherein the vector representing the position of each cell in the input table comprises a Fourier encoding of its position in the input table.

4. The method of claim 1, wherein the encoder of the table transformer is trained to generate the contextual embeddings using an attention mechanism.

5. The method of claim 1, wherein the table summary comprises a sequence of text, and the decoder is trained to generate the sequence of text.

6. A system, comprising:

a data repository comprising a plurality of tables each comprising a plurality of cells;

an electronic device executing a table embedding computer program that is configured to receive an input table out of the plurality of tables from the data repository, separate the plurality of cells in the input table by data type of each cell, wherein the plurality of cells are separated into cells of a text data type and cells of a numeric data type, embed, for each cell of the input table, the data type for the cell, embed, for each cell having the numeric data type, an embedding vector for a numeric value in the cell using linear projection, enhance the cells of the input table based on a position by embedding a vector representing the position of each cell in the input table, generate contextual embeddings for the input table using an encoder of a table transformer, and generate a table summary for the contextual embeddings using a decoder for the table transformer; and a downstream system that is configured to receive the contextual embeddings from the table embedding computer program.

7. The system of claim 6, wherein the table embedding computer program is further configured to embed, for each cell having the text data type, a semantic representation of text present in the cell.

8. The system of claim 6, wherein the vector representing the position of each cell in the input table comprises a Fourier encoding of its position in the input table.

9. The system of claim 6, wherein the encoder of the table transformer is trained to generate the contextual embeddings using an attention mechanism.

10. The system of claim 6, wherein the table summary comprises a sequence of text, and the decoder is trained to generate the sequence of text.

11. A non-transitory computer readable storage medium, including instructions stored thereon, which when read and executed by one or more computer processors, cause the one or more computer processors to perform steps comprising:

receiving an input table comprising a plurality of cells;

separating the plurality of cells in the input table by data type of each cell, wherein the plurality of cells are separated into cells of a text data type and cells of a numeric data type;

embedding, for each cell of the input table, the data type for the cell;

embedding, for each cell having the numeric data type, an embedding vector for a numeric value in the cell using linear projection;

enhancing the cells of the input table based on a by embedding a vector representing a position of each cell in the input table;

generating contextual embeddings for the input table using an encoder of a table transformer; and generating a table summary for the contextual embeddings using a decoder for the table transformer.

12. The non-transitory computer readable storage medium of claim 11, further including instructions stored thereon, which when read and executed by the one or more computer processors, cause the one or more computer processors to perform steps comprising:

embedding, for each cell having the text data type, a semantic representation of text present in the cell.

13. The non-transitory computer readable storage medium of claim 11, wherein the vector representing the position of each cell in the input table comprises a Fourier encoding of its position in the input table.

14. The non-transitory computer readable storage medium of claim 11, wherein the encoder of the table transformer is trained to generate the contextual embeddings using an attention mechanism.

15. The non-transitory computer readable storage medium of claim 11, wherein the table summary comprises a sequence of text, and the decoder is trained to generate the sequence of text.

\* \* \* \* \*